No. 795,968. PATENTED AUG. 1, 1905.
G. W. & C. E. GOSS.
CULTIVATOR.
APPLICATION FILED SEPT. 17, 1904.
2 SHEETS—SHEET 1.
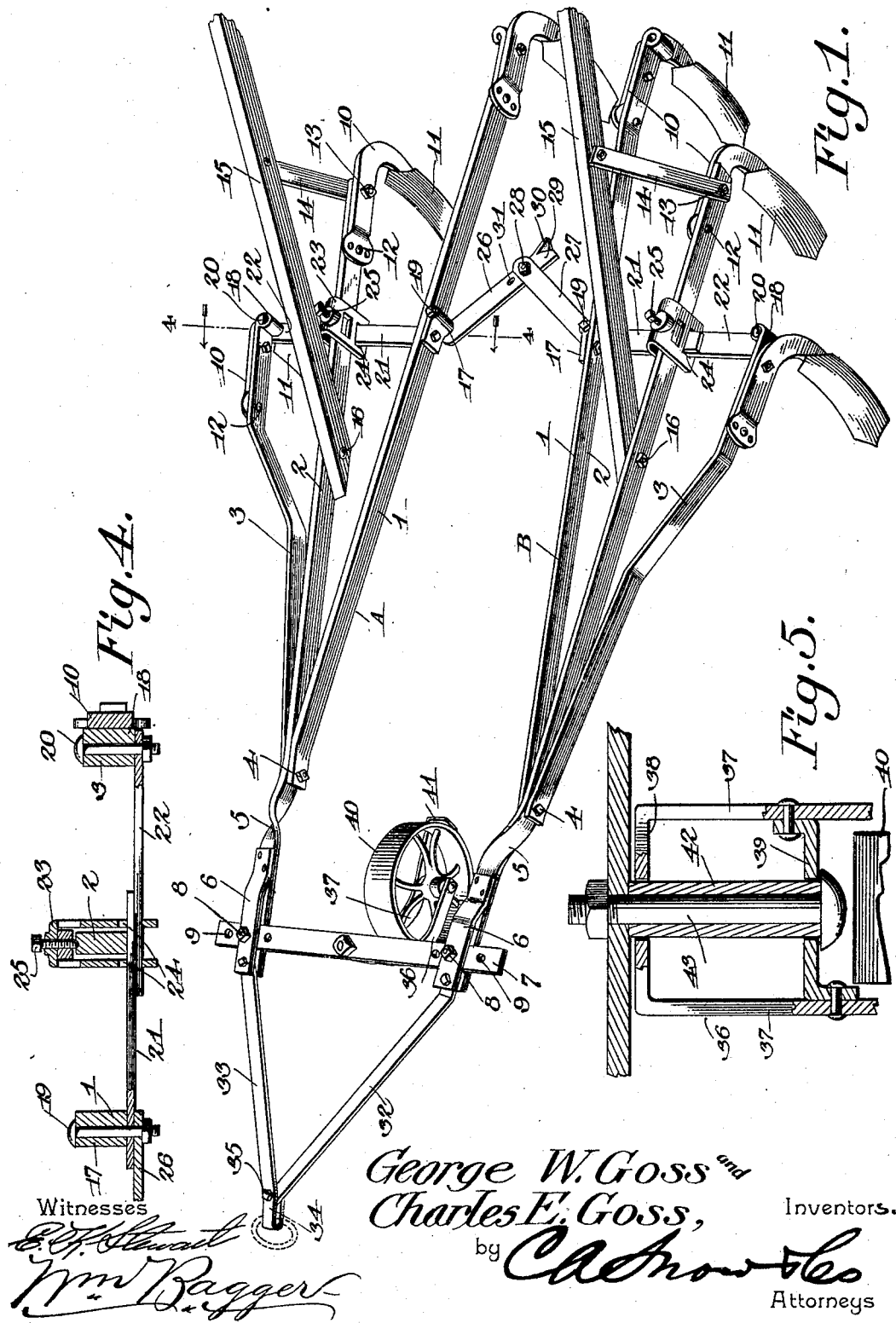

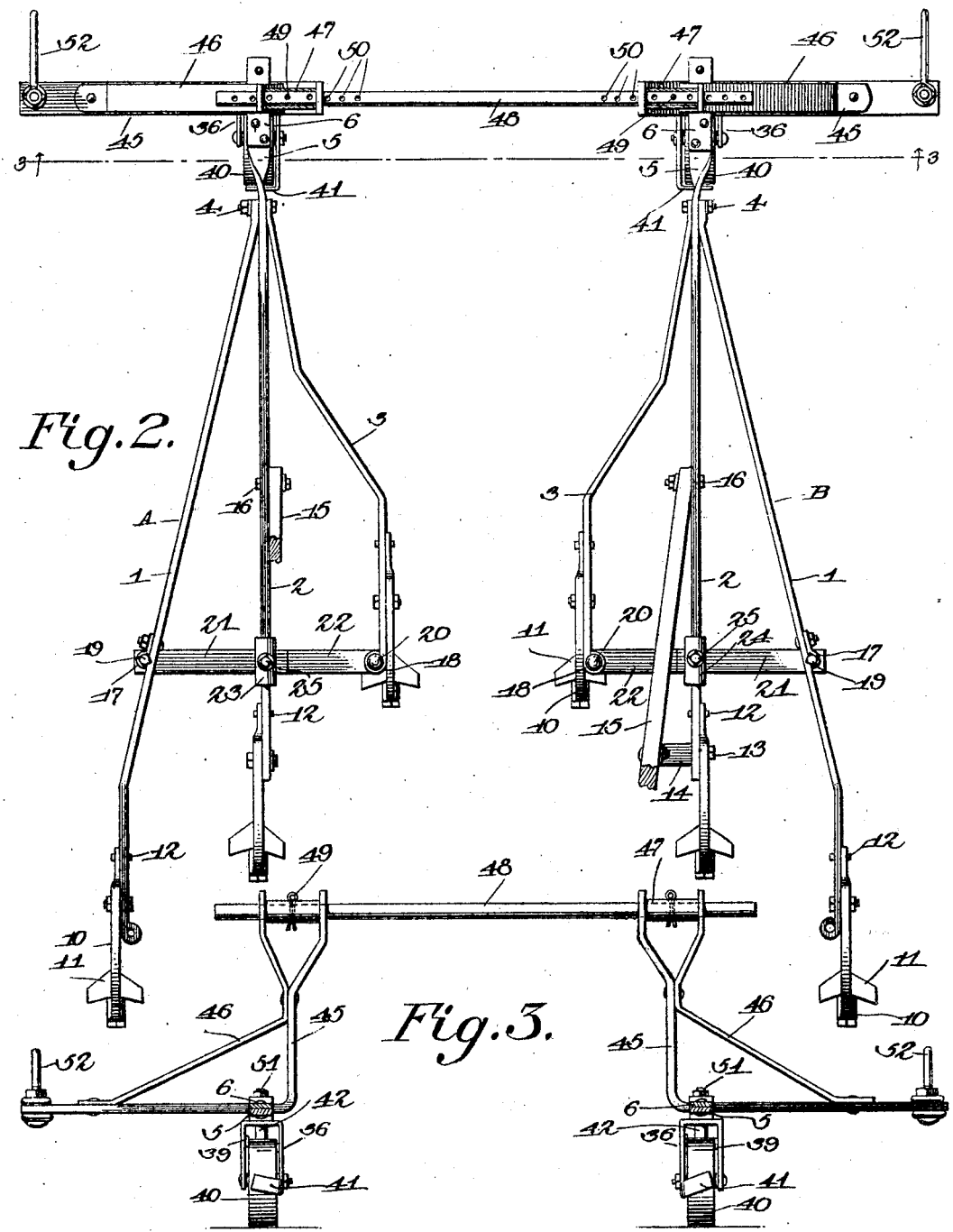

UNITED STATES PATENT OFFICE.

GEORGE W. GOSS AND CHARLES E. GOSS, OF BALTIMORE, OHIO.

CULTIVATOR.

No. 795,968. Specification of Letters Patent. Patented Aug. 1, 1905.

Application filed September 17, 1904. Serial No. 224,878.

*To all whom it may concern:*

Be it known that we, GEORGE W. Goss and CHARLES E. Goss, citizens of the United States, residing at Baltimore, in the county of Fairfield and State of Ohio, have invented a new and useful Cultivator, of which the following is a specification.

This invention relates to cultivators of that class which are generally known as "walking-cultivators," and has for its object to improve the construction and to reduce the cost of manufacture of implements of this character.

Another object of the invention is to produce a cultivator of the class described which shall be adapted to be used either between the rows or as a straddle-row cultivator, attachments being provided whereby the one-horse cultivator may be transformed into what is known as a "two-horse tongueless cultivator."

With these and other ends in view, which will readily appear when the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that changes and modifications may be made within the scope of the invention without departing from the spirit or sacrificing the efficiency of the same.

In said drawings, Figure 1 is a perspective view showing the cultivator arranged for use as a one-horse cultivator. Fig. 2 is a plan view showing the same arranged as a two-horse tongueless cultivator. Fig. 3 is a transverse sectional view taken on the line 3 3 of Fig. 2. Fig. 4 is a sectional view taken on the line 4 4 in Fig. 1. Fig. 5 is a sectional detail view, enlarged, taken through the upper portion of the shank of one of the casters or supporting-wheels and the supporting means therefor.

Corresponding parts in the several figures are indicated by like characters of reference.

The right and left hand gangs or rigs of the cultivator are indicated in Fig. 1 of the drawings, respectively, by A and B. Each of said gangs is composed in the first instance of three beams 1, 2, and 3, which are connected together near their front ends by transverse bolts 4, which are sufficiently loose to admit of the proper spacing apart of the rear ends of the beams. The inner beams are, as usual, longer than the middle ones, while the outer beams terminate in front of the middle beams. The middle beams 2 are extended forwardly and are quarter-twisted, as shown at 5, and to the said quarter-twisted portions are secured clamping-plates 6, between which and the quarter-twisted portions the ends of a spacing-bar 7 are adjustably secured by means of bolts 8, said spacing-bar being provided near its ends with pluralities of perforations 9 for the passage of said bolts.

Near the rear ends of the several cultivator-beams are pivotally secured the angular standards 10, carrying the blades or shovels 11, the front ends of said standards being adjustably connected with the beams in the usual manner by means of break-pins 12. The bolts 13, which serve for the attachment of the shovel-carrying standards to the middle beams 2, also serve for the attachment of the lower ends of braces 14, supporting the handles 15, the lower ends of which are bolted at 16 to the beams 2.

The inner and outer beams of each gang are provided with eyes 17 18 for the passage of bolts 19 20, the lower ends of which serve for the attachment of straps 21 22, which overlap each other under the middle beam. Mounted upon the middle beam of each gang is a U-shaped clip 23, the arms of which are provided at their lower ends with slots 24 for the passage of the overlapping ends of the slots 21 22. Each of the clips 23 is provided with a set-screw 25, bearing against the upper side of the beam 2, upon which it is adjusted. It will be seen that by loosening these set-screws the rear ends of the beams 1 and 3 may be moved toward or away from the central beam 2, while by simply tightening the set-screws the beams will be securely retained in any position to which they may have been adjusted.

The bolts 19, connected with the eyes 17 of the inner beams 1, pivotally support a pair of links 26 27, which are hingedly connected by means of a bolt 28. The link 26 has an extension 29 provided with an upturned flange 30. It will be seen that by manipulating the handles the gangs or rigs may be moved quite close together, or they may be spaced apart any desired distance within the limit of the length of the links.

This distance may be regulated by adjusting the bolt 28 in any one of a plurality of perforations 31 in the link-plate 29. When the gangs are spaced apart, the flange or lug 30, by abutting against the rear side of the link 27, will prevent the links from being extended to a point at which the bolt 28 will be in alinement with the bolts 19, and consequently on a dead-center, which would prevent the gangs from being readily moved in the direction of each other.

Between the front ends of the beams 2 and the clamping-plates 6 are secured a pair of draft-straps 32 33, the latter of which is provided at its front end with a downturned hook 34 for the reception of the front end of the strap 32, which is secured in said hook by means of a bolt 35. It will be seen that by simply detaching this bolt a whiffletree-ring may be inserted in the hook 34, whereby restoring the bolt 35 it will be securely locked against any possibility of displacement.

Secured centrally to the under side of the spacing-bar 7 is a frame 36, including side pieces 37, connected at their upper ends by a top piece 38 and spaced apart by a cross-piece 39. Pivotally secured or journaled between the side pieces 37 is a wheel or caster 40, one of said side pieces being extended and bent to form a scraper 41. The top piece 38 and the cross-piece 39 are perforated for the passage of a tubular washer 42, through which passes the connecting-bolt 43, said tubular washer being of a length exceeding the distance between the outer sides of the top piece and the cross-piece, thus permitting the frame 36, carrying the caster-wheel, to swivel freely upon the said tubular washer.

The operation of this device as a one-horse cultivator will be readily understood. For the purpose of converting the same into a two-horse tongueless cultivator an attachment is employed, including a pair of angle-bars 45, each provided with an inclined brace 46, the upper end of which is bent and spaced apart from the upper end of the angle-bar by means of a tubular washer 47. The two angle-bars are mounted upon a connecting-rod 48, which extends through the tubular washers and through perforations alining therewith in the upper ends of the angle-bars and braces, the desired adjustment being effected by means of cotter-pins 49 passing through alining perforations in the tubular washers and in the connecting-rod, the latter being provided near each end with a plurality of such perforations 50 for the passage of the cotter-pins.

In order to connect the cultivator-frames with the angle-bars, the draft-straps 32 33, the spacing-bar 7, and the links 26 27 are disconnected therefrom. Said gangs are then reversed—that is to say, the right-hand gang of the single cultivator becomes the left-hand gang of the double cultivator, the gangs being connected with the horizontal parts of the angle-bars by inserting the latter between the quarter-twisted front ends of the beams 2 and the clamping-bars 6, the attachment being effected by means of bolts 51, upon the lower ends of which caster-wheels of the construction already described are mounted. It is obvious that the caster-wheel may be transferred from the single cultivator to one of the angle-bars. The latter are provided at the ends thereof with clevises 52 for the attachment of the draft.

From the foregoing description, taken in connection with the drawings hereto annexed, the operation and advantages of the invention will be readily understood by those skilled in the art to which it appertains. The facility with which it may be transformed from a single to a double cultivator renders it extremely convenient and useful, especially for those whose means will not permit them to invest in a large variety of implements.

Having thus described the invention, what is claimed is—

1. In a cultivator, a pair of gangs each including three beams loosely connected near their front ends, means for adjustably connecting the front ends of the gangs, eyes upon the inner and outer beams of each gang, bolts in said eyes, straps pivoted upon said bolts, means for adjustably connecting said straps with the middle beam, auxiliary links pivotally connected with the bolts extending through the eyes upon the inner beams of the gangs, one of said links being extended beyond the pivotal point and provided with an upturned flange, and a bolt pivotally and adjustably connecting said links.

2. In a cultivator, a pair of gangs, means for adjustably connecting the front ends of the gangs, handles connected with the gangs, links connected pivotally with the inner beams of the gangs and having pivotal connection with each other, one of said links being extended beyond the pivotal point and provided with an upturned flange.

In testimony that we claim the foregoing as our own we have hereto affixed our signatures in the presence of two witnesses.

GEORGE W. GOSS.
CHARLES E. GOSS.

Witnesses:
F. M. PAUL,
EDWARD E. ROCKEY.